UNITED STATES PATENT OFFICE.

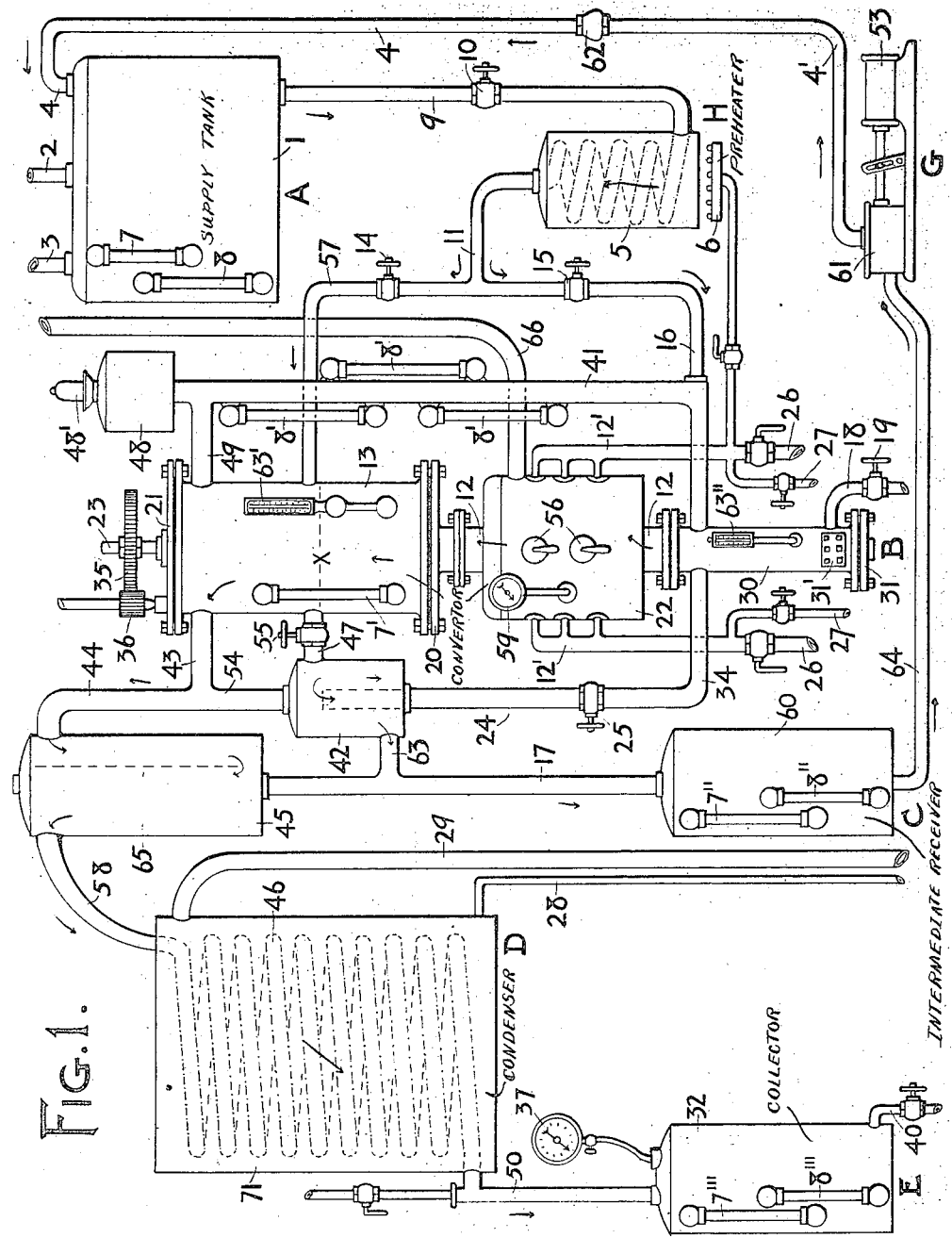

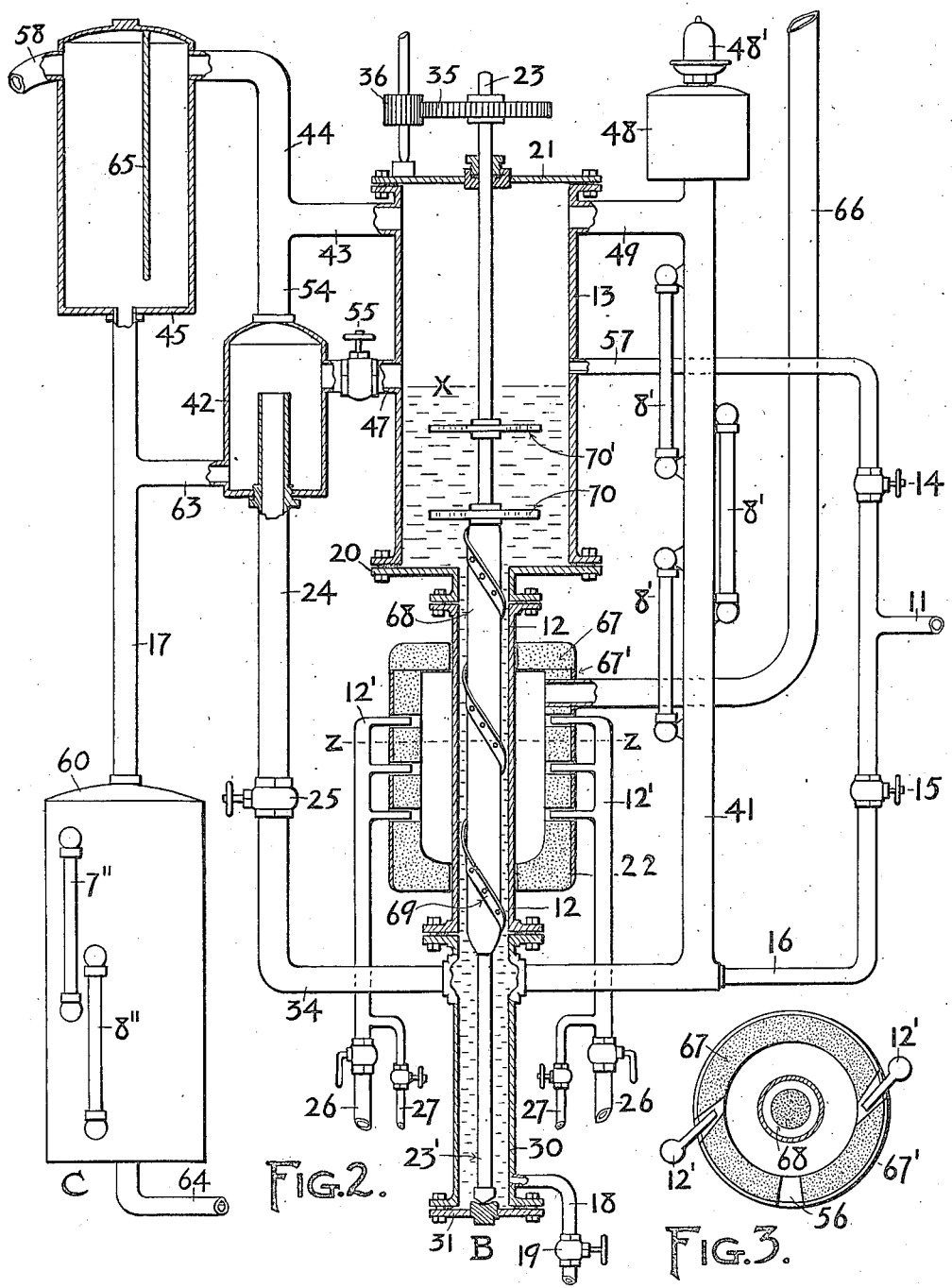

JOSEPH H. ADAMS, OF BROOKLYN, NEW YORK, ASSIGNOR TO THE TEXAS COMPANY, OF HOUSTON, TEXAS, A CORPORATION OF TEXAS.

PROCESS FOR THE CONVERSION OF LIQUIDS, FLUIDS, AND OILS.

1,327,263.     Specification of Letters Patent.     Patented Jan. 6, 1920.

Application filed March 30, 1911, Serial No. 618,011. Renewed April 11, 1919. Serial No. 289,425.

*To all whom it may concern:*

Be it known that I, JOSEPH H. ADAMS, a citizen of the United States, residing at Brooklyn, in the county of Kings and State of New York, have invented a new and useful Process for the Conversion of Liquids, Fluids, and Oils, and of which the following is a specification.

This invention relates broadly to the art of essentially converting fluids, such as oils, into products of a dissimilar character, in contradistinction from fractional distillation processes, but in its more intense aspect it consists in a thermal method of converting more or less refined mineral hydro-carbon oils, such as those of the benzin, kerosene, gas and fuel oil series into the more volatile products resembling light oils, benzins and the naphthas, which are characterized by a lower specific gravity and greater commercial value.

It is also within the scope of this invention to treat the various crude petroleums having asphalt and tar bases in such a manner that the oils driven off in vapors when collected and condensed will have a lower specific gravity and greater volume than the products obtained from similar crude oil by any of the known methods of fractional distillation, while at the same time the residues will have greater commercial value than those obtained by the fractional distillation methods.

One object of this invention is to formulate a process of a commercially practical nature for carrying out the above stated conversion or transformation (as clearly distinguished from a mere distillation) by means of externally applying a high degree of heat to a chamber composed of a heat enduring material maintaining a pressure in said chamber, while containing hydro-carbon oils, and heating the walls of said chamber to an incandescent temperature of sufficient intensity to locally crack and convert the said oils into oils or oily spirits essentially different in nature from untreated oils, the pressure being maintained while the cracked vapors are being condensed as hereinafter explained. By the term vapor I mean the gaseous form of a substance which is normally liquid at ordinary atmospheric temperature.

As conducing to a better understanding of the ultimate basis of this invention, it may here be recalled that crude petroleum, by a process of fractional distillation, may be separated into a multitude of component parts comprising spirits, oils, heavy bottoms and residues differing from one another in insensible gradations.

Commercially, the distillation of crude oil is not carried to extreme limits of refinement, the aim being to produce the maximum yield of the three principal products for which there is the greatest demand.

Of these, kerosene 43° to 47° Baumé gravity constitutes about 60% of the crude petroleum (Pennsylvania); naphtha of about 62° gravity Baumé 4% of the crude petroleum; "automobile naphtha," "stove naphtha" and others called "gasolene" ranging from 64° to 85° gravity Baumé, about 10% of the crude petroleum and the balance, or about 26% of crude petroleum, represents the heavy bottoms from which the lubricating oils and wax are obtained and the residues of pitch, or coke, if the distillation is carried to extreme limits.

Owing to the somewhat unsettled state of the nomenclature of mineral oils, these products are sometimes given modified names, particularly with regard to the "gasolene" series which at the present time is extensively sold under Baumé gravities considerably less than was the custom a few years ago.

The fact remains, however, that these products, no matter how they may be named or classed, are not usually single distinctive oils, but as ordinarily found in commerce are in reality unseparated mixtures of higher and lower gravity oils having their component parts so proportioned that their average gravity conforms to the Baumé gravities by which the various by-products of the crude petroleum are known commercially as lubricating, fuel, gas and kerosene oils, benzins, naphthas and gasolenes.

Thus, an analysis by fractional distillation will show each of these commercial products to consist of a multitude of fractions ranging through a wide scale of gravities from the semi-solids below 25° gravity Baumé to the most volatile spirits in the neighborhood of 85° gravity Baumé and slightly higher, although those which form the greater proportion of any one product will possess gravities within a range from 10 to 20 points in the Baumé scale and approximately the gravity of the product.

The ordinary process of fractional distillation will not accomplish the results which constitute the objects of this invention since that process merely serves to more or less perfectly separate the oils (which may be regarded as mechanical mixtures) into their component parts.

However, by the herein disclosed process discovered by me, it is now quite feasible to convert a high specific gravity oil of the benzin, kerosene, gas and fuel oil types into a lower specific gravity oil or petroleum spirit mixture such as benzin, naphtha or so called "gasolene".

This I accomplish by subjecting the oil or mixture of oils to the powerful influence of pressure and a properly applied external decomposing temperature varying in intensity according to the character of the particular oil undergoing treatment.

In one part of the process of refining oils by fractional distillation, more particularly those of the lower Baumé gravity type, and commonly known as "tar", the oil is heated in the "tar" still to a temperature of approximately 1000° F. to more or less perfectly break up the heavier molecules.

This, however, is a distinct operation from my process where I employ an intense temperature and pressure in breaking up the high boiling point hydrocarbons into those of lower boiling points to increase the yield of gasolenes and naphthas, the pressure being maintained during condensation of the lower boiling point hydrocarbons as hereinafter explained.

The nature of the process is such that its full disclosure may be greatly facilitated by describing certain characteristic features of an apparatus adapted to carry out the same, in conjunction with the statements detailing the manner in which the oil will course through and undergo essential change in quality in the various parts of the apparatus.

In the drawings, like character of reference denote corresponding parts through the several views of which: Figure 1 is an assembly in elevation of the apparatus as designed for commercially carrying out my process.

Fig. 2 is a sectional elevation showing one of the many possible forms of converter which may be employed for externally subjecting oil to a cracking or decomposing temperature by the application of an intense heat to the exterior walls of an oil containing chamber composed of heat enduring material.

Fig. 3 is a horizontal section taken through line z—z of Fig. 2.

Referring now to Fig. 1, A represents a suitable supply apparatus which serves as a source of the oil which is to be converted.

As will be understood, this oil supply apparatus may assume diverse forms, but that shown in the drawing will be found quite suitable for ordinary usage.

In this embodiment, the containing vessel 1 of the supply apparatus A may be somewhat elevated with respect to the adjacent converter B so that the gravitating tendency of the oil may augment its flow into the converter B under the influence of the more or less weight of oil in the tank and pressure which may be maintained over it, notwithstanding the compression which may be maintained over the surface of the oil in the converter.

The fluid oil may be admitted into the containing vessel or tank 1 by means of one or more suitable supply pipes indicated by 2, while at the same time the displaced air may escape through pipe 3, from the top of tank 1, or pipe 3 may be connected with a suitable air compressor so that a pressure may be maintained over the surface of oil contained in tank 1 to further augment the flow of oil from the tank to the converter B.

Such tank 1 may also be provided with suitable glass sight gages 7 and 8 if desired, and in like manner, gages 7' and 8' may be provided on the adjacent converter B.

A pipe 9 connects the supply tank 1 with the oil heater H in any desired manner, then from the heater the heated oil is conducted through pipe 11 to converter B, as shown.

It is best to heat the oil before it is admitted to the converter B so that the heat from the furnace of the converter may be conserved for the more important function of cracking, splitting the molecules of and rapidly vaporizing the oil, and therefore the oil heater H is provided in which the oil may be brought to any desired temperature within the container 5 by gas blast from jets 10, 6, or by other economical means of heating.

The oil heater H is placed in the piping system between the source of oil supply A and the converter B.

The figures of the drawing show one of the many diverse forms which the converter may assume within the contemplation of this invention, and such converter here shown comprises a chamber 12 of heat enduring material and a covered containing vessel or liquid and vapor dome 13, closed at the top by means of cap 21.

The supply pipes 9 and 11 lead the oil to pipes 16 and 57 governed by hand valves 15 and 14 through either one of which oil is admitted to the chamber 12 and lower part of dome 13. These sections may be connected with the gage column 41 on which the glass sight gages 8' are arranged so that the condition and disposition of the contents of the converter may always be the more readily apparent and be susceptible of an intelligent variation by operating the hand valve 10 for regulating the flow of original oil through the supply pipe 9.

The vapor dome 13 may also be provided with a gage glass 7' for comparative observation.

At the lower part of the converter B and connected to chamber 12 a heavy bottoms and residue chamber 30 is arranged to collect the precipitated carbon and foreign substances thrown down by this converting process, and near to the lower end a suitable drip or outlet pipe 18 may be provided and controlled by the valve 19, shown in Fig. 1 and Fig. 2.

The bottom of chamber 30 is closed by a plate 31 and a hand hole plate 31' by means of which the chamber may be emptied of its more solid contents and cleared of any sediment which may accumulate therein.

The closed containing vessel or vapor dome 13 is secured to the heat enduring or cracking chamber 12 by means of a suitable interposed flange member 20 which is securely bolted to each of these respective sections.

Inasmuch as the vapors rising into and filling the upper part of the vapor dome 13 may, at any time, be so rapidly evolved as to exert an undue pressure, I have arranged a compression tank 48 and pop valve 48' in relation with the upper part of the cylinder or vapor dome 13 by means of the pipe 49 so that any sudden pressure above a given number of pounds to the superficial inch will cause the spring check in the seat of pop valve 48' to rise and release the excessive pressure.

In other words, by fixing the upper limit of pressure in the apparatus the evolved vapors maintain a predetermined desired pressure therein, the evolved vapors being solely relied upon in accordance with the preferred embodiment of my invention as actually used in practice, before my original application S. #535,879 was originally filed and on which this application was primarily based.

Of course, the converter and fittings are made up as tight as possible and, therefore, I have used between the several flanges and caps, gaskets of asbestos and other oil and heat resisting and indestructible materials, so that the possibility of leakage may be obviated so far as may be necessary from a practical standpoint.

A feature of primary importance is the means for externally applying heat of intense temperature to the oil while contained in the heat enduring chamber 12 when under compression above that of the atmosphere for the purpose of bringing about a conversion of such oil.

Preferably this feature is operated by gas and air blast under pressure and comprises one or more jets 12' through which a proper mixture of gas and air is forced and ignited to form the necessary elements of combustion.

The nozzles of these jets are projected through openings or ports into an inclosed retort 22 composed of fire brick or fused quartz linings 67 held together within a strong and suitable metallic shell 67', as shown in Fig. 3, and provided with an exhaust pipe 66 to lead out the spent gas and fumes of combustion.

This inclosed retort is designed to conserve the greater part of the intense heat from the several gas jets 12' for the purpose of maintaining the walls of the heat enduring chamber 12 at a temperature of sufficient variable intensity, to crack or decompose oils of varying characteristics which may be contained within the chamber.

In the shown form this retort 22 with its intake pipes 26 and 27 and outlet or exhaust pipe 66 is made up in circular form to inclose the greater part of the cylindrical heat enduring chamber 12 and, while this precise form may be varied to conform to the different shapes and designs in which retorts can be made commercially available for this purpose, the form shown in Figs. 1, 2 and 3 will be found very suitable for converting many classes of petroleum oil. This retort or furnace 22 and heat enduring chamber 12 are especially adapted for the economical use of a mixture of gas and air under pressure as an intense heating fuel, and while this unit B is but one form of converter, a number of such units in series would possess commercial advantages.

The gas and air being brought in separately through pipes 26 and 27 become mixed within the pipe leading to the jets 12'.

When this combustible mixture is ignited the heat action within the retort 22 and the color of the walls of the heat enduring chamber 12 may be observed through the sight ports 56, located in the walls of the retort 22, and indicated also by the pyrometer 59 located in a central position on the retort, where the thermal end may extend into the body of the generated heat within the inclosure.

For the preservation of the heat enduring chamber 12 and the distribution of heat generated within the walls of the retort 22 the jets 12' are arranged to enter the ports in the walls of the retort at a tangent whereby a circulating heat may be distributed about the exterior walls of chamber 12, as indicated in Fig. 3, instead of the jets being projected directly at local parts of the cracking chamber 12 with chances of possible destruction.

This form of intense heater is especially adapted for working in the oil and gas regions where the cost of natural gas is very low or the gas manufactured in gas producer plants and fuel oil is inexpensive, or where cheap gas is not obtainable then the form of heater may be changed to conform to the available fuel or means of heat generation to carry on this process.

The oil containing and cracking chamber 12 may be constructed of various heat enduring metals, alloys, carbons, graphites, graphitic carbon and other materials known to withstand a constant or varying temperature of high intensity, but as the structural character of such a part does not relate specifically to a process invention it will be unnecessary to elaborate thereon in this process disclosure.

This intense externally applied heat affects the contained oil in such a manner as to very efficiently convert the same and is thus adapted to assist in a step of primary importance to my process.

It may here be stated that, when operating upon certain classes of oils, that is, the more volatile oils and spirits, it is highly desirable to localize the application of the external heat so as to prevent the spread, so to speak, of the heat in a lower degree of intensity throughout the mass than is necessary to efficiently "crack" the oil, but of a sufficient intensity to cause an evaporation of undue amounts of the oil at a distance from the intensely heated walls of the cracking chamber without bringing about a conversion.

To this end, in the embodiment of the apparatus shown by Fig. 2, I have provided a cylindrical core or sheath 68 of a size designed to fill a larger part of the central space within the cracking chamber 12 and to displace a considerable amount of oil which would otherwise be contained therein, thereby compelling such oil as may be located between this core 68 and the containing chamber 12 to come into more or less direct contact with the intensely heated walls of the cracking chamber 12.

This core 68 is supported by the rods 23 and 23', the whole forming a shaft which by means of a bearing in cap 31 at the bottom of heavy bottoms chamber 30 and a packed bearing or gland in the vapor dome cap 21, may be caused to revolve when the gears 35 and 36 arranged above the crown of the vapor dome 13 are operated upon by power.

A helical collar or worm 69 of metal or other suitable material is attached to the periphery of the core 68 but in such a manner as not to directly engage the interior surfaces of the cracking chamber 12.

This core-cylinder and collar, when revolving, agitates the oil contained within the cracking chamber 12 and causes it to be thrown into more or less close proximity to the intensely heated walls of the chamber for the purpose of cracking, splitting the molecules of and otherwise converting all or as much of the original oil as may be possible during the accelerated movements within and passage through the chamber.

Another specific function of the helical collar 69, when in rotation, is to remove and throw down the accumulation of scales and particles of carbon and coke which may adhere to the interior surfaces of the cracking chamber 12.

From this it will be understood that whenever the fluid to be converted is admitted to the chamber 12 and containing-vessel 13 and brought to the proper and safe level, as indicated by the dotted line X in the dome 13, and also indicated in the gages 7' and 8', it is in a position to be operated upon by the externally applied intense heat which will be maintained within the retort, and in close relation to the original oil through the walls of the cracking chamber and which, when evolved as vapors, will be constantly and uniformly replaced by fresh quantities of untreated and non-converted oil.

In other words, the oil contained within the channel between the core 68 and chamber 12 will be held in place by the head weight of oil contained in the lower part of vapor dome 13, thus preventing the intense heat from so rapidly volatilizing the small amount of oil in this channel and driving it away from the intensely heated walls of the chamber, before additional oil could be supplied to take its place, that burning or searing could result from the ignition of superheated oil vapors which might at times become mixed with air or other re-active agents.

The retort 22 being preferably constructed of suitable heat resisting and conserving material, admirably serves to localize the intense heat just where it is most needed, i. e. in the immediate vicinity of the more or less central part of the cracking chamber 12.

On the other hand, the unconverted oil contained in the lower part of vapor dome 13 does not become heated to such a degree as to cause undue evaporation but allows the lighter and more volatile oils to pass through it and escape to the top of the dome in the form of vapors from which they pass out through pipe 43 while the unconverted heavier oil is discharged through pipe 47 into liquid trap 42.

From the foregoing it will be seen that during the maintenance of high temperature within the retort, for the purpose of intensely heating the walls of the cracking chamber while containing oil, the effect of this heat is to cause the oil which is in the immediate vicinity of the internal walls of the chamber to be broken up or converted into oils having a lower specific gravity.

The action is extremely violent, causing the "cracked" oil to become immediately vaporized and the uprising of this vapor brings about a furious local agitation within the cracking chamber and the contained oil.

In order to prevent excessive agitation and to prevent particles of oil being projected above the body of fluid in vapor dome 13 and allowing them to drop back again into the heated mass and thereby causing a deteriorating reaction, perforated baffle plates 70 and 70' are located on the rod or shaft 23 and made fast so that they occupy a position within the body of oil, as shown in Fig. 2. It may also be mentioned that owing to the excessive quantity of heat, and owing also to the fact that much of the heat will radiate at a diminished temperature into surrounding portions of the oil more distant from the incandescent walls of the cracking chamber, considerable oil may and will be volatilized without undergoing conversion, just as illuminating oils and naphthas are boiled and vaporized without essential conversion in the ordinary process of fractional distillation. By operating apparatus under pressure, however, I am able to reduce the undesirable volatilization without conversion to a minimum, and as a consequence the oils are in a large proportion "cracked" or otherwise converted in character.

Oil will be constantly flowing toward and into contact with the walls of the cracking chamber 12 to take the place of that already vaporized.

This newly admitted oil will in turn be "cracked" and changed in the apparatus into lighter or more volatile products.

Thus, the complex mixture of oils, known commercially as "distillates" of benzin, kerosene, gas and fuel oils, may be changed or transformed by means of my process into a mixture of lighter oils and spirits which bear a general resemblance to and have the properties of that which is known as illuminating oil, naphtha and gasolene.

It may be mentioned also that during this operation, the raw non-converted oils will be relieved of more or less of the carbon of which they are in part composed, as well as some of the foreign substances which it is desirable to eliminate.

This, of course, alters their chemical character and converts them from one or more of the products of the hydro-carbon series into those of lower specific gravity and possibly different character. The carbon which is removed in this manner will be in part deposited upon the hot walls of the cracking chamber and in part precipitated in the adjacent oil, being to some extent held in suspension and to some extent gravitating through the oil toward the heavy bottoms chamber provided for its accumulation.

When operating in this manner it has been observed that apparently only a certain part of the fluid ultimately evaporated comes in direct contact with the highly heated walls of the cracking chamber, for the reason that the condition of the heat is sufficient to evaporate a certain somewhat remote portion of the oil at a lower temperature than is required for "cracking" the oil.

Accordingly, the vapors passing into the dome 13 will be composed not only of the oil which has suffered a breaking up of its molecules and deposition of a part of its carbon by the high converting heat, but will also contain a certain portion of the unchanged original oil in the form of vapor.

These mixed vapors are evolved very rapidly owing to the high temperature of the cracking chamber, and consequently care should be exercised to keep the oil level line in the dome 13 at the proper mark in the glass gages and not permit it to fall below or approach a line which borders on or approaches near to the walls of the cracking chamber and which might be followed by searing or burning the oil and destroying it for commercial purposes.

The mixed vapors pass from the dome 13 into discharge pipe 43, and thence through the pipe 44 to a vapor trap 45 in which a baffle plate 65 is arranged in such a manner as to make it necessary for the light vapors to descend nearly to the bottom of the trap on one side of the plate and rise again on the other before they can escape through the goose neck 58 to the condensing apparatus D.

Vapors not light enough to rise in pipe 44 are condensed, then conducted to a liquid trap 42 through the pipe 54, and in like manner vapors not light enough to rise in the vapor trap 45, after descending along the baffle plate 65, fall to the bottom of trap 45 and the condensate is led through pipe 17 into the receiving tank 60 of apparatus C, which is provided with glass sight gages 7" and 8", and from which it may be withdrawn and returned to the supply tank 1 by means of the suction pump 61 of apparatus G and the pipe 64.

By means of the pump operating mechanism 53 the oil is conveyed through return pipe 4' and 4 in which the check valve 62 is located to relieve the back pressure on the pump, and finally the oil is admitted through the top of tank A, as the original oil was let in through pipe 2.

The lighter mixed vapors pass from the trap 45 through the goose neck 58 and into a suitable condensing coil of pipe 46 immersed in a water tank 71 forming a part of the condensing apparatus D of Fig. 1.

This apparatus D is provided with a cold water supply pipe 28 and an overflow pipe 29 whereby a continuous flow of cold water can be maintained within the tank 71 for the purpose of bringing about a complete condensation of vapors passing through the coils of pipe.

Since some of the vaporized original unconverted oil may tend to condense before reaching the condensing apparatus D, I prefer to connect the bottom of pipe 54 with the liquid trap 42 so that condensate may be led through pipe 63 into pipe 17, the upper end of which is in turn connected with the bottom of vapor trap 45, so that all condensate not accumulated through condensing apparatus D may be returned to tank 1 after it is collected in receiving tank 60 of apparatus C.

In this manner the already-condensed unconverted oil may be passed into the cracking chamber again without first being mixed with and separated from the converted condensed oils in apparatus D by a fractional distillation method.

After passing through the coil condenser and cooling tank apparatus D, the fluid oil passes through pipe 50 into the apparatus E of which tank 32, provided with glass gages 7''' and 8''', is the container and from which it can be withdrawn by means of cock 40, shown in Fig. 1.

For the treatment of certain oils it is necessary to maintain a more or less complete compression of one or more atmospheres in the apparatus from the source of supply to the end of or beyond the condenser in conjunction with the other features of my invention, for thereby I am enabled to retard to a certain extent the overproduction of vapors and the volatilization of oil that must necessarily be held in check within the cracking chamber 12 until as much of the "cracking" operation can be performed on the contained fluid as experience and practice warrants.

Furthermore, the vapor compression in connection with the treatment of certain oils will promote uniformity and certainty in the satisfactory operation of the process, and therefore, the compression in addition to normal atmospheric pressure becomes an important feature in this process.

Thus, from practical experience, it has been found that a pressure maintained over a body of oil contained in the converter retards the vigorous volatilization of the lighter vapors in a desirable manner, assists in the conversion of oil and renders a more uniform flow of product therefrom.

On the other hand, a greater pressure maintained over a body of oil contained within the converter and throughout the system from the source of supply to the end of or beyond the condenser when treating and converting low Baumé gravity oil helps materially in this process of conversion.

The composite oil withdrawn from tank 32 may either be directly returned to the converter in order to still further decompose the same into lighter products, or it may be subjected to fractional distillation or other operations to more or less completely segregate its components, and such components as may not be of the desired quality may then be returned to the converter for further treatment.

When treating oils of different gravities, it may be desirable to cause them to flow either upward or downward through the cracking chamber 12, and for this purpose intake pipes 16 and 57 are provided.

When fluid is admitted through the lower part of apparatus B, valve 14 in pipe 57 and valve 25 in pipe 24 is closed.

Valve 15 in pipe 16 and valve 55 in pipe 47 is opened thereby allowing the oil to flow through pipe 16 into the lower part of the converter.

By the continuous method of supply and discharge, the unconverted oil which has not been driven off in vapors flows out through pipe 47 into liquid trap 42, then through pipe 63 into pipe 17 and down into tank 60.

When oil is admitted to the upper part of converter B through pipe 57, valve 15 in pipe 16 and valve 55 in pipe 47 is closed and valve 25 in pipe 24 is opened.

The head weight and pressure on the oil in the lower part of vapor dome 13 causes the oil to flow down through cracking chamber 12 and out through pipe 34.

It is then forced up through pipe 24 and over into liquid trap 42 and flows out through pipe 63 into pipe 17 from which it is discharged into tank 60.

For the purpose of determining the proper speed at which the oil should flow through converter B, the thermometer 63' is located near the lower external part of vapor dome 13, and to determine the nature of the heavy bottoms in chamber 30 the thermometer 63'' is located on the chamber so that the registered heat will enable an oil operator to know when to withdraw some of the contents.

The above specifically described apparatus may, of course, be modified greatly and yet be well adapted to carry out one or more of the essential correlated steps of my process.

It is apparent that I have succeeded in formulating a process well suited for achieving the several objects and ends in view, and that as a result I have made it possible to readily convert comparatively inexpensive commercially available oils into products of greater value.

In view of the foregoing disclosure, it will be obvious to those skilled in the art of oil refining that my process may be carried out with different fluids from those specified herein, by varied steps, and with the assistance of different apparatus without, however, departing from the scope of my invention, and accordingly I intend that all matter contained in the above description shall be interpreted as illustrative and not in a limited sense. Inasmuch as the precise degree of temperature at which the walls of the cracking chamber should be maintained in practice, will largely depend upon and be varied with particular conditions, such as the composition of the raw oil to be converted, and it will be sufficient to state that the temperature will generally vary from a low red to a full white or incandescent heat, according to the nature of the fluid to be treated.

It will of course be understood by those skilled in the art that the temperature at which the walls of the cracking chamber become incandescent will vary in accordance with the material of which it is composed and it will further be understood that the temperature necessary to secure the desired cracking of the oils will vary with the character of the material under treatment. The terms "incandescent," "a low red," and "a full white heat," as above used, are therefore not to be considered as terms of limitations upon the use of the process since it will be understood from the nature and purpose of the process that the essential point in this respect is merely that the temperature of the oil in the chamber be raised to the temperature at which the desired cracking will take place.

I desire it to be understood also that the language adopted in the following claims is intended to cover all of the generic and specific features of the herein disclosed invention, and all statements of the scope thereof which, as a matter of language, might be said to fall therebetween.

Having described my invention, what I claim as new and desire to secure by Letters Patent is:

1. A process of treating high-boiling hydrocarbon oils to convert a relatively large percentage of the same into lower boiling hydrocarbon oils which consists in continuously supplying the high-boiling hydrocarbon oils to a closed chamber subjecting the high boiling hydrocarbon oils in liquid form to a cracking temperature in said closed chamber under pressure to evolve vapors of the desired lower boiling hydrocarbon oils and condensing said vapors by passing them through connections to a condenser, all of the connections to and through the condenser being in open communication so as to insure a substantially uniform pressure from the heater to the condenser.

2. A process of converting oil which consists in subjecting the oil to a cracking temperature under pressure in a closed chamber, supplying oil to said chamber during the cracking operation to maintain a body of liquid therein, and condensing the evolved vapors of the cracked or converted oil by passing said vapors through connections to a condenser all of the connections through and to the condenser being in open communication so as to insure a substantially uniform pressure from the heater to the condenser.

3. A process of treating high-boiling hydrocarbons to obtain a relatively large yield of lower-boiling hydrocarbons, consisting in continuously admitting the high-boiling hydrocarbons from a supply to a closed chamber, subjecting a body of liquid hydrocarbons in said chamber to a cracking temperature under pressure, and condensing the evolved vapors of the cracked or converted oil by passing said vapors through connections to a condenser all of the connections through and to the condenser being in open communication so as to insure a substantially uniform pressure from the chamber through the condenser and drawing off the residue and returning it to the supply.

4. The method of treating hydrocarbons of high-boiling point to obtain hydrocarbon oils of lower boiling point which consists in heating the high boiling hydrocarbons in liquid form to a cracking temperature in a chamber under pressure and condensing the cracked vapors produced by passing the same from the said chamber to a condenser, supplying hydrocarbons of high-boiling point to said chamber during the cracking operation to maintain a proper supply therein, separating heavier products from the cracked vapors at a point between said chamber and said condenser and maintaining the connection from said chamber to and through the condenser in open communication so as to insure substantially uniform pressure from the chamber through the condenser, and returning said heavier product to said chamber whereby the desired low boiling hydrocarbon oil is continuously and ultimately produced.

5. A method of converting oils which consists in continuously feeding oil under pressure to a chamber, heating said oil in liquid form in the chamber to a cracking temperature while maintaining a vapor pressure on said oil in said chamber, condensing the vapors generated, by passing them through connections to a condenser all of the connections to and through the condenser being in open communication so as to insure a substantially uniform pressure from the chamber through the condenser, withdrawing lighter condensate from the condenser, and returning heavier condensate to the said chamber for repetition of the treatment, whereby a lighter condensate is continuously produced as the ultimate product.

6. A process of converting oil which consists in causing oil to flow from a source of supply in a confined liquid stream restricted in cross section, heating said liquid stream to a cracking temperature, thereby generating vapor pressure, and condensing the cracked vapors by passing them under substantially the same pressure at all points through a condenser in open communication with said stream of oil, whereby low boiling or converted oil is continuously produced and collected as an ultimate product in said condenser.

7. A process of converting oil which consists in maintaining a body of oil in a pipe-like heater, heating said oil in liquid form in said heater at a cracking temperature, maintaining vapor pressure on said oil while being subjected to the cracking temperature and condensing the vapors generated by passing them under substantially the same pressure at all points through a condenser, whereby lower boiling or converted oil is continuously produced and collected as an ultimate product in said condenser, 8. A process of converting oil which consists in continuously passing oil in a relatively thin stream under pressure through a pipe-like heater to a larger container or vapor dome in open communication therewith, heating said oil locally as it passes through said pipe-like heater to a cracking temperature, maintaining substantially the same vapor pressure on said oil in said heater and vapor dome and conducting off and condensing the vapors in said dome.

9. A process of converting oil which consists in continuously passing oil in a relatively thin stream under pressure through a pipe-like heater to a larger container or vapor dome in open communication therewith whereby the pressure will be substantially the same in said heater and dome, heating said oil locally as it passes through said pipe-like heater to a cracking temperature, passing the vapors from said dome through connections to a condenser all of the connections to and through the condenser being in open communication so as to insure a substantially uniform pressure from the heater through the dome and condenser.

10. A process of treating high boiling hydrocarbons to obtain lower boiling point hydro-carbons which consists in continuously supplying the high boiling point hydro-carbons to a closed chamber, subjecting the high boiling hydro-carbons to a cracking temperature in said closed chamber under pressure, removing carbon from the heated portion of said heated chamber and passing the vapors evolved through connections to a condenser all in open communication so as to insure a substantially uniform pressure from the heater through the condenser.

11. A process of treating high boiling hydro-carbons to obtain lower boiling point hydro-carbons which consists in continuously supplying the high boiling point hydro-carbons to a closed chamber, subjecting the high boiling hydro-carbons to a cracking temperature in said closed chamber under pressure, allowing the carbon produced by said cracking temperature to descend by gravity out of the heated zone and passing the vapors evolved through connections to a condenser all in open communication so as to insure a substantially uniform pressure from the heater through the condenser.

12. A process of converting oil which consists in subjecting the oil to a cracking temperature under pressure in a closed chamber, supplying oil to said chamber during the cracking operation to maintain a proper supply therein, removing the carbon from the heated portion of said chamber and passing the the vapors evolved through connections to a condenser all in open communication so as to insure a substantially uniform pressure from the heater through the condenser.

13. A process of treating high boiling hydro-carbons to obtain lower boiling hydro-carbons which consists in continuously admitting the high-boiling hydro-carbons from a supply to a closed chamber, subjecting the hydro-carbons in said chamber to a cracking temperature under pressure, removing the carbon from the heated portion of said heated chamber, passing the vapors evolved through connections to a condenser, all in open communication so as to insure a substantially uniform pressure from the chamber through the condenser, and drawing off the residue between said chamber and condenser and returning it to the supply.

14. A process of treating high boiling hydro-carbons to obtain lower boiling hydro-carbons which consists in continuously admitting the high-boiling hydro-carbons from a supply to a closed chamber, subjecting the hydro-carbons in said chamber to a cracking temperature under pressure, allowing the heavy residue and carbon produced by said cracking temperature to descend by gravity out of the heated zone, passing the vapors evolved through connections to a condenser, all in open communication so as to insure a substantially uniform pressure from the chamber through the condenser, and drawing off the residue between said chamber and condenser and returning it to the supply.

15. A process of converting oil which consists in causing oil to flow from a source of supply in a confined liquid stream restricted in cross section, heating said liquid stream to a cracking temperature, thereby generating vapor pressure, separating out the heavy residue and carbon and passing the cracked vapors under substantially the same pressure through a condenser in open communication with said oil.

16. A process of converting oil which consists in continuously supplying oil to a pipe-like heater, heating said oil in said heater at a cracking temperature, maintaining vapor pressure on said oil while being subjected to the cracking temperature, allowing the carbon to descend by gravity out of the cracking zone, and passing the vapors generated under substantially the same pressure through a condenser.

17. A process of converting oil which consists in continuously passing oil in a relatively thin stream under pressure through a pipe-like heater to a larger container or vapor dome in open communication therewith, heating said oil locally as it passes through said pipe-like heater to a cracking temperature removing from said pipe-like heater and collecting carbon resulting in said pipe-like heater, maintaining substantially the same vapor pressure on said oil in said heater and vapor dome and conducting off and condensing the vapors in said dome.

18. A process of converting oil which consists in continuously passing oil in a relatively thin stream under pressure through a pipe-like heater to a larger container or vapor dome in open communication therewith whereby the pressure will be substantially the same in said heater and dome, heating said oil locally as it passes through said pipe-like heater to a cracking temperature, continuously separating out and removing from said pipe-like heater carbon produced in said pipe-like heater, passing the vapors from said dome through connections to a condenser all in open communication so as to insure a substantially uniform pressure from the heater through the dome and condenser.

19. A method of converting oils which consists in continuously feeding oil under pressure to a vertically arranged chamber, heating said oil in said chamber above its bottom to a cracking temperature while maintaining a vapor pressure on said oil in said chamber, allowing the carbon to descend by gravity to the bottom of said chamber beyond the heating zone and continuously passing the vapors generated through connections to a condenser all in open communication so as to insure a substantially uniform pressure from the chamber through the condenser.

20. A method of converting oils which consists in continuously feeding oil under pressure to a vertically arranged chamber, heating said oil in said chamber above its bottom to a cracking temperature while maintaining a vapor pressure on said oil in said chamber, allowing the carbon to descend by gravity to the bottom of said chamber beyond the heating zone, permitting the vapors generated to pass from said chamber, separating the heavier vapors from the lighter converted vapors and passing the lighter vapors through a condenser, the connections through which said vapors pass to and through the condenser being all in open communication so as to insure a substantially uniform pressure from the chamber through the condenser.

21. A method of converting oils which consists in heating oil in a vertically arranged chamber above its bottom to a cracking temperature while maintaining a vapor pressure on said oil in said chamber, allowing the carbon to descend by gravity to the bottom of said chamber beyond the heating zone, permitting the vapors generated to pass from said chamber, separating the heavier vapors from the lighter converted vapors and passing the lighter vapors through a condenser, the connections through which said vapors pass to and through the condenser being all in open communication so as to insure a substantially uniform pressure from the chamber through the condenser.

22. A method of converting oils which consists in heating oil under pressure in a vertically arranged chamber above its bottom to a cracking temperature while maintaining a vapor pressure on said oil in said chamber, allowing the carbon to descend by gravity to the bottom of said chamber beyond the heating zone and continuously passing the vapors generated through connections to a condenser all in open communication so as to insure a substantially uniform pressure from the chamber though the condenser.

23. A process of treating high boiling hydro-carbons to obtain lower boiling hydrocarbons which consists in subjecting the high boiling hydro-carbons to a cracking temperature in a closed chamber under pressure, allowing the carbon produced by said cracking temperature to descend by gravity out of the heated zone and passing the vapors evolved through connections to a condenser all in open communication so as to insure a substantially uniform pressure from the heater through the condenser.

24. A process of treating high boiling hydrocarbons to obtain lower boiling hydro-carbons which consists in supplying the high boiling hydro-carbons to a closed chamber, subjecting the high boiling hydro-carbons to a cracking temperature in said closed chamber under pressure of the evolved vapors, moving carbon from the heated portion of said heated chamber and passing the vapors evolved through connections to a condenser all in open communication so as to insure a substantially uniform pressure from the heater through the condenser.

25. A method of converting oil which consists in feeding oil under pressure to a chamber, heating said oil in liquid form in the chamber to a cracking temperature while maintaining a vapor pressure on the oil in said chamber, condensing the vapors generated by passing them through connections to a condenser, all of the connections to and through the condenser being in open communication so as to insure a substantially uniform pressure from the chamber through the condenser, withdrawing lighter condensate from the condenser and returning heavier condensate to said chamber for repetition of the treatment, whereby lower boiling condensate or converted oil is ultimately produced in said chamber.

26. A process of changing high boiling hydrocarbon oils to obtain lower boiling hydrocarbon oils which consists in subjecting the high boiling hydrocarbons in liquid form in a chamber to a cracking temperature therein, condensing the evolved vapors by permitting them to pass freely to a condenser and maintaining a substantial pressure throughout the cracking chamber and condenser solely by the vapors evolved in the chamber and withdrawing the lower boiling oils from the condenser as the ultimate product.

27. A method of converting oils to obtain a relatively large yield of lower boiling oils which consists in heating the oils to be converted, in liquid form, in a chamber to a cracking temperature while maintaining a vapor pressure on said oils in said chamber solely by the vapors generated therein, and condensing said generated vapors by passing them through connections to a condenser all in open communication so as to insure a substantially uniform pressure from the chamber through the condenser and withdrawing the lower boiling oils from the condenser as the ultimate product.

28. A method of converting oils to obtain a relatively large yield of lower boiling oils which consists in supplying oil to a chamber, supplying heat to a body of oil in liquid form therein at a temperature sufficient to crack the oil, condensing the evolved vapors by continuously passing them to a condenser in open communication with the chamber and confining the evolved vapors for maintaining a material pressure above atmospheric effected by the volatile constituents of the liquid so as to insure a substantially uniform self-imposed pressure from the chamber through the condenser and withdrawing the converted oil from the condenser as the ultimate product.

29. A process of treating high boiling hydrocarbons to obtain a relatively large yield of lower boiling hydrocarbons which consists in subjecting a body of the high boiling hydrocarbons in liquid form to a cracking temperature in a closed chamber, and condensing the vapors evolved by passing them through a condenser in free communication with the chamber and while subjected solely to the pressure of the evolved vapors in excess of atmospheric pressure in the chamber and to and through the condenser and withdrawing the converted oil from the condenser as the ultimate product.

30. A process of converting oil which consists in continuously supplying oil to a pipe-like heater, heating said oil in said heater at a cracking temperature, maintaining vapor pressure on said oil while being subjected to the cracking temperature, allowing the carbon to descend by gravity out of the cracking zone, and passing the vapors generated through a condenser.

31. A method of converting oils which consists in continuously feeding oil under pressure to a vertically arranged chamber, heating said oil in said chamber above its bottom to a cracking temperature while maintaining a vapor pressure on said oil in said chamber, allowing the carbon to descend by gravity to the bottom of said chamber beyond the heating zone and continuously passing the vapors generated through connections to a condenser.

In testimony whereof I affix my signature in the presence of two witnesses.

JOSEPH H. ADAMS.

Witnesses:
 AUSTIN ADAMS,
 JOEL S. DE SELDING.

DISCLAIMER.

1,327,263.—*Joseph H. Adams*, Brooklyn, N. Y. PROCESS FOR THE CONVERSION OF LIQUIDS, FLUIDS, AND OILS. Patent dated January 6, 1920. Disclaimer filed March 27, 1929, by the assignee by mesne assignments, *The Texas Company*.

Hereby present the following disclaimer as to such claims, to wit:

1. Your petitioner disclaims from claim 2 all processes except those in which the oil which is subjected to a cracking temperature under pressure includes large percentages of oil in the boiling range of kerosene which is being converted into benzin, naphtha and gasoline.

2. Your petitioner disclaims from claim 5 all processes except those in which the heavier condensate returned to the chamber for repetition of the treatment is composed of oil, a large percentage of which is in the boiling range of kerosene.

3. Your petitioner disclaims from claim 6 all processes except those in which the liquid stream restricted in cross-section flows into a larger unfired container wherein liquid and vapors separate, a relatively large liquid body is maintained, and additional vaporization takes place.

4. Your petitioner disclaims from claim 7 all processes except those wherein the pipe-like heater is maintained in part, at least, at a temperature as high as a visible red and oil is caused to flow through the pipe-like heater to a larger unfired container where liquids and vapors separate, a relatively large liquid body is maintained, and additional vaporization occurs.

5. Your petitioner disclaims from claim 9 all processes except those in which a relatively large body of liquid oil is maintained in the larger container or vapor dome, and some liquid oil is withdrawn therefrom.

6. Your petitioner disclaims from claim 15 all processes except those wherein the confined liquid stream restricted in cross-section flows first into a larger container holding a relatively large liquid body, in which container liquids and vapors separate and from which the separated cracked vapors are led off to the condenser.

7. Your petitioner disclaims from claim 25 all processes except those in which the heavier condensate returned to the chamber for repetition of the treatment is composed of oil, a large percentage of which is in the boiling range of kerosene.

8. Your petitioner disclaims from claim 28 all processes except those in which the oil supplied to the chamber includes large percentages of oil in the boiling range of kerosene and in which such oils are being cracked into oils in the boiling range of benzin, naphtha and gasoline.

[*Official Gazette April 9, 1929, and May 14, 1929.*]